United States Patent
Xiangli et al.

(10) Patent No.: US 11,086,482 B2
(45) Date of Patent: Aug. 10, 2021

(54) METHOD AND DEVICE FOR DISPLAYING HISTORY PAGES IN APPLICATION PROGRAM AND COMPUTER-READABLE MEDIUM

(71) Applicant: Beijing Xiaomi Mobile Software Co., Ltd., Beijing (CN)

(72) Inventors: Fei Xiangli, Beijing (CN); Baoke Chen, Beijing (CN); Zhuang Qian, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 365 days.

(21) Appl. No.: 15/466,888

(22) Filed: Mar. 23, 2017

(65) Prior Publication Data
US 2017/0293403 A1   Oct. 12, 2017

(30) Foreign Application Priority Data
Apr. 11, 2016   (CN) .......................... 201610221944.0

(51) Int. Cl.
*G06F 3/0482* (2013.01)
*G06F 3/0483* (2013.01)
*G06F 16/955* (2019.01)
*G06F 9/451* (2018.01)
*G06F 3/0488* (2013.01)

(52) U.S. Cl.
CPC .......... *G06F 3/0482* (2013.01); *G06F 3/0483* (2013.01); *G06F 3/04883* (2013.01); *G06F 9/451* (2018.02); *G06F 16/955* (2019.01)

(58) Field of Classification Search
CPC ........ G06F 3/0482; G06F 9/451; G06F 16/00; G06F 3/048
See application file for complete search history.

(56) References Cited

U.S. PATENT DOCUMENTS

| | | | | |
|---|---|---|---|---|
| 5,801,702 A | * | 9/1998 | Dolan ................... | G06F 16/748 715/854 |
| 6,012,093 A | * | 1/2000 | Maddalozzo, Jr. ... | G06F 16/954 709/223 |
| 6,633,316 B1 | | 10/2003 | Maddalozzo, Jr. et al. | |

(Continued)

FOREIGN PATENT DOCUMENTS

| | | |
|---|---|---|
| CN | 103310007 A | 9/2013 |
| CN | 103544288 A | 1/2014 |
| CN | 105786894 A | 7/2016 |

OTHER PUBLICATIONS

International Search Report of PCT/CN2016/095875.
Extended European Search Report of EP Application No. 17158829.6 dated Aug. 2, 2017.

*Primary Examiner* — Kavita Stanley
*Assistant Examiner* — Phoebe X Pan
(74) *Attorney, Agent, or Firm* — Jun He Law Offices P.C.; James J. Zhu

(57) ABSTRACT

A method and device for displaying pages in application program and a computer-readable medium are provided. The method includes: receiving a first preset operation of a user on an application program that is currently running; displaying path information of pages accessed historically by the user in the application program according to the first preset operation, wherein the path information comprise a sequential relationship among the pages.

11 Claims, 8 Drawing Sheets

(56) References Cited

U.S. PATENT DOCUMENTS

| | | | | |
|---|---|---|---|---|
| 6,667,751 | B1* | 12/2003 | Wynn | G06F 16/955 715/833 |
| 6,973,619 | B1* | 12/2005 | Hirose | G06F 16/9577 715/234 |
| 6,982,708 | B1* | 1/2006 | Mah | H04L 29/12594 345/418 |
| 7,062,475 | B1* | 6/2006 | Szabo | G06Q 30/02 706/11 |
| 7,185,274 | B1* | 2/2007 | Rubin | G06F 17/2235 715/205 |
| 7,225,407 | B2* | 5/2007 | Sommerer | G06F 16/957 715/738 |
| 7,251,775 | B1* | 7/2007 | Astala | H04L 29/06 715/205 |
| 7,555,479 | B2* | 6/2009 | Piersol | G06F 16/40 |
| 7,587,460 | B2* | 9/2009 | Saito | H04L 69/04 358/1.13 |
| 7,797,336 | B2* | 9/2010 | Blair | G06F 16/382 707/773 |
| 8,522,148 | B1* | 8/2013 | Pry | G06F 16/951 715/745 |
| 8,560,702 | B2* | 10/2013 | Malik | H04L 67/145 709/227 |
| 8,667,017 | B1* | 3/2014 | Forney | G06Q 10/103 707/782 |
| 8,719,708 | B2* | 5/2014 | Talaat | H04L 29/08 715/738 |
| 8,839,096 | B2* | 9/2014 | Bostick | G06F 16/957 715/244 |
| 8,914,362 | B1* | 12/2014 | Zamir | G06F 16/9535 707/732 |
| 9,940,659 | B1* | 4/2018 | Behbahani | G06Q 30/0643 |
| 9,965,133 | B1* | 5/2018 | Lindsey | H04L 63/101 |
| 2002/0023178 | A1* | 2/2002 | Strasnick | G06F 16/957 719/329 |
| 2002/0198882 | A1* | 12/2002 | Linden | G06F 16/9535 |
| 2003/0046281 | A1* | 3/2003 | Son | G06F 16/955 |
| 2003/0066031 | A1* | 4/2003 | Laane | G06F 16/957 715/234 |
| 2004/0003351 | A1* | 1/2004 | Sommerer | G06F 16/955 715/251 |
| 2004/0139143 | A1* | 7/2004 | Canakapalli | G06F 16/957 709/200 |
| 2005/0132018 | A1* | 6/2005 | Milic-Frayling | G06F 16/955 709/213 |
| 2005/0268301 | A1* | 12/2005 | Kelley | G06F 9/4843 718/100 |
| 2006/0224583 | A1* | 10/2006 | Fikes | G06F 16/9535 |
| 2006/0267970 | A1* | 11/2006 | Minakuchi | H04N 1/00453 345/204 |
| 2007/0130153 | A1* | 6/2007 | Nachman | G06F 16/9537 |
| 2007/0146160 | A1* | 6/2007 | Takeshita | G08C 23/04 340/13.24 |
| 2008/0250107 | A1* | 10/2008 | Holzer | H04L 51/04 709/206 |
| 2009/0100021 | A1* | 4/2009 | Morris | G06F 16/955 |
| 2009/0222454 | A1* | 9/2009 | Liesche | G06F 16/954 |
| 2009/0222478 | A1* | 9/2009 | Okamoto | G06F 16/00 |
| 2009/0245643 | A1* | 10/2009 | Hasegawa | H04N 1/0035 382/181 |
| 2010/0079377 | A1* | 4/2010 | Katsura | H04N 1/00437 345/168 |
| 2010/0114916 | A1* | 5/2010 | Cooke | G06F 16/954 707/752 |
| 2010/0123938 | A1* | 5/2010 | Sunami | G06F 16/955 358/1.18 |
| 2010/0131870 | A1 | 5/2010 | Park | |
| 2011/0066982 | A1* | 3/2011 | Paulsami | G06F 16/955 715/835 |
| 2011/0131533 | A1* | 6/2011 | Ku | G06F 3/0482 715/836 |
| 2011/0202847 | A1* | 8/2011 | Dimitrov | G06F 3/0481 715/738 |
| 2012/0151397 | A1* | 6/2012 | Oberstein | G06F 16/168 715/769 |
| 2012/0272192 | A1* | 10/2012 | Grossman | G06F 3/0484 715/854 |
| 2013/0174074 | A1* | 7/2013 | Strzygowski | G06Q 10/10 715/771 |
| 2013/0238665 | A1* | 9/2013 | Sequin | G06F 9/451 707/797 |
| 2013/0268100 | A1* | 10/2013 | Miyata | H04N 21/4667 700/88 |
| 2014/0156648 | A1* | 6/2014 | Liu | G06F 16/955 707/722 |
| 2014/0258875 | A1 | 9/2014 | Somerfield | |
| 2014/0282118 | A1* | 9/2014 | Kumamoto | G06F 16/95 715/760 |
| 2014/0303975 | A1* | 10/2014 | Ohmura | G10L 15/22 704/235 |
| 2014/0304272 | A1* | 10/2014 | Park | G06F 16/954 707/740 |
| 2014/0310653 | A1* | 10/2014 | Han | G06F 3/0482 715/810 |
| 2014/0359489 | A1* | 12/2014 | Zhao | G06F 16/955 715/760 |
| 2015/0007065 | A1* | 1/2015 | Krishnamoorthy | H04L 67/22 715/760 |
| 2015/0046975 | A1* | 2/2015 | Kato | H04L 63/08 726/3 |
| 2015/0149492 | A1* | 5/2015 | Janakiraman | G06F 16/90344 707/758 |
| 2015/0205879 | A1* | 7/2015 | Karasudani | G06F 16/957 707/737 |
| 2015/0293685 | A1* | 10/2015 | Chen | G06Q 10/10 715/804 |
| 2017/0212962 | A1* | 7/2017 | Choi | G06F 3/0482 |
| 2018/0010273 | A1* | 1/2018 | Maki | D05C 5/06 |
| 2018/0189099 | A1* | 7/2018 | Meng | G06F 9/4881 |
| 2018/0196865 | A1* | 7/2018 | Rabin | H04L 63/0428 |
| 2018/0246937 | A1* | 8/2018 | Alphin, III | G06F 16/248 |

* cited by examiner

METHOD AND DEVICE FOR DISPLAYING HISTORY PAGES IN APPLICATION PROGRAM AND COMPUTER-READABLE MEDIUM

CROSS-REFERENCE TO RELATED APPLICATION

This application and claims priority to Chinese Patent Application No. 201610221944.0, filed Apr. 11, 2016, which is incorporated herein by reference in its entirety.

FIELD

The present disclosure generally relates to the field of communication technology, and more particularly to a method and device for displaying pages in application program and a computer-readable medium.

BACKGROUND

With the development of smart phones, the applications in the smart phones become more and more complex and it is difficult for many users to find the specific location of current page in the application and to understand the logical structure of pages, which causes confusion and inconvenience for users when using these applications.

SUMMARY

Embodiments of the present disclosure provide a method and device for displaying pages in an application program. The technical solutions are as follows.

According to a first aspect of the present disclosure, a method for displaying pages in an application program is provided, and the method includes: receiving a first preset operation of a user on an application program that is currently running; displaying path information of pages accessed historically by the user in the application program according to the first preset operation, wherein the path information comprise a sequential relationship among the pages.

According to a second aspect of embodiments of the present disclosure, a device for displaying pages in an application program is provided, and the device includes: a processor; a memory for storing instructions executable by the processor; wherein the processor is configured to: receive a first preset operation of a user on an application program that is currently running; display path information of pages accessed historically by the user in the application program according to the first preset operation, wherein the path information comprise a sequential relationship among the pages.

According to a third aspect of the present disclosure, there is provided a non-transitory computer-readable storage medium having stored therein instructions that, when executed by a processor, causes the processor to perform a method for displaying pages in an application program is provided, and the method includes: receiving a first preset operation of a user on an application program that is currently running; displaying path information of pages accessed historically by the user in the application program according to the first preset operation, wherein the path information comprise a sequential relationship among the pages.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention.

Instead, they are merely examples of apparatuses and methods consistent with aspects related to the invention as recited in the appended claims.

Figure 1A:
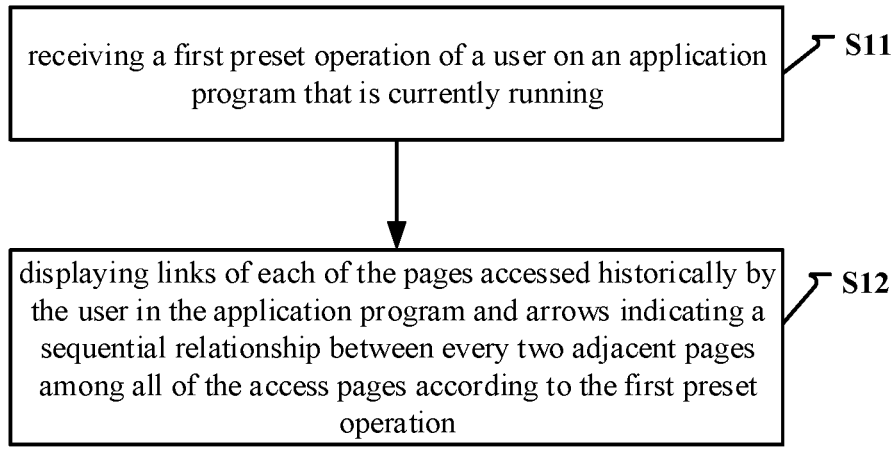
FIG. 1A is a flow diagram illustrating a method for displaying pages in an application program according to an exemplary embodiment.

FIG. 1A is a flow diagram illustrating a method for displaying pages in application program according to an exemplary embodiment, the method for displaying pages in application program is used in terminal. Exemplarily, the terminal may be, for example a mobile phone, a computer, a digital broadcasting terminal, a message transceiver, a game control panel, a tablet, a medical equipment, a fitness equipment, a personal digital assistant, etc. Refer to FIG. 1, the method comprises steps S11-S12 as follow.

In step S11, receiving a first preset operation of a user on an application program that is currently running.

Exemplarily, the first preset operation may be either click or long press operation for shortcut key, or click operation for the preset icon on the interface of the application program that is currently running.

In step S12, displaying path information of pages accessed historically by the user in the application program according to the first preset operation, wherein the path information comprise a sequential relationship among the pages.

In one embodiment, before performing step S12, all the pages accessed after user entering the application program that is currently running may be recorded by the terminal system. Exemplarily, after performing the first preset operation by the user, the path information of the recorded pages may be displayed on the current interface by the terminal responding to the first preset operation.

In one embodiment, path information of the pages may comprise sequential relationship among the pages for example. Exemplarily, the sequential relationship among the pages may be displayed on the current interface in the manner of arrows or lines by the terminal according to the first preset operation.

The method provided by the embodiments would display the path information of the pages accessed historically by the user in the application program that is currently running, so that the user can better understand the pages organizational logic of the current application program and the sequential relationship of the accessed pages according to the path information of the pages. Thus, quick presentation and switching between multiple pages can be implemented, and the user experience for the application program can be improved.

Figure 1B:
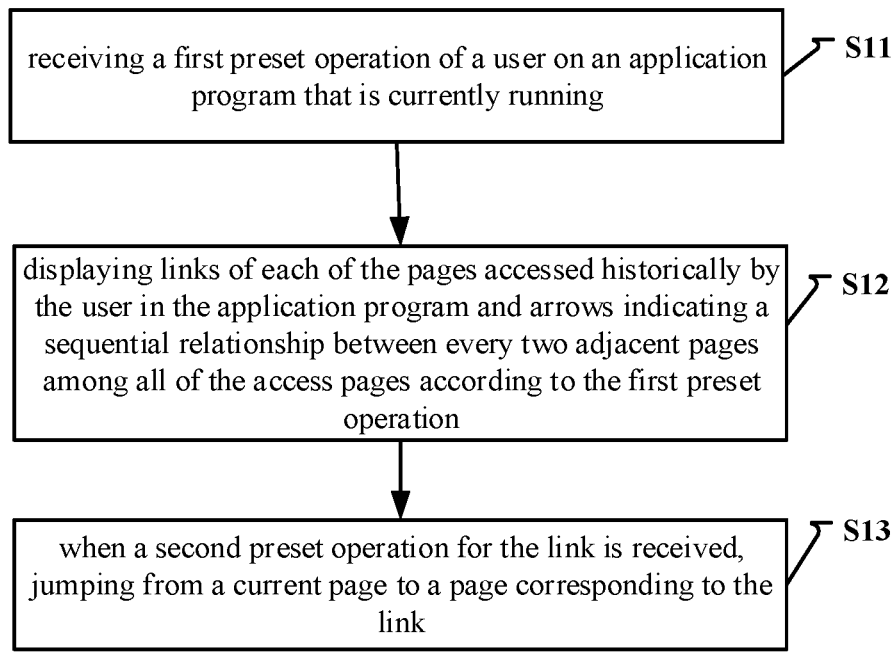
FIG. 1B is a flow diagram illustrating a method for displaying pages in an application program according to an exemplary embodiment.

In one embodiment, the path information further comprises a link to each of the pages. As shown in FIG. 1B, the method further comprises step S13 as follow.

In step S13, when a second preset operation for the link is received, jumping from a current page to a page corresponding to the link.

Exemplarily, the second preset operation may be single or multiple click operation, long press operation, slide or drag operation, etc.

In the embodiment, when the operation for the link is received, jumping from a current page to a page corresponding to the link, so that the user can use the displayed link to quickly switch to the page to be viewed without jumping to multiple pages step-by-step. Thus, quick presentation and switching between multiple pages can be implemented, and the user experience for the application program can be improved.

In one embodiment, the link of the page comprises at least one of: a page identification, a page thumbnail with a preset size.

In one embodiment, the page identification may comprise any one or more of name, subject, website address. In one embodiment, the page thumbnail is original interface diagram of the page. Exemplarily, when the path information of the multiple pages accessed historically needs to be displayed on the terminal interface, for example in manner of page thumbnail, the path information may be displayed in the page thumbnail with a preset size which should be smaller than the size of the terminal interface. In one embodiment, the preset size is a particular value that is smaller than the size of the original interface diagram, for example, ⅛, ⅓, ¾ of the size of the original interface. But the embodiments of the present disclosure is not limited to this, the preset size may be adjusted dynamically with the number of the pages: the more pages, the smaller preset size; the less pages, the larger preset size. For example, the corresponding relationship between the number of the pages and the preset size may be predetermined. When the number of the pages is multiplied, the preset size is reduced corresponding multiples.

Figure 2:
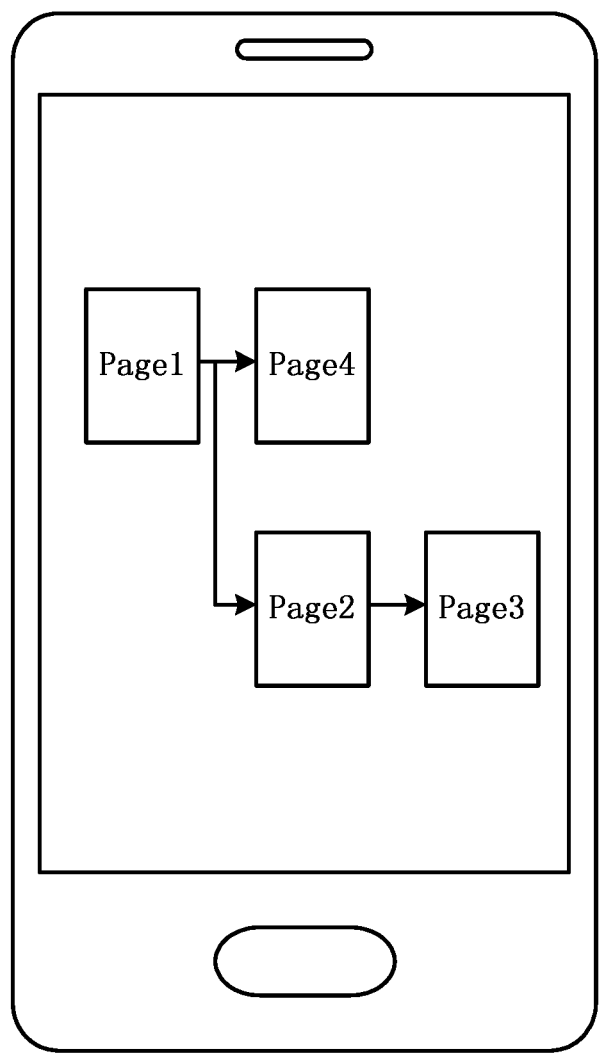
FIG. 2 is a diagram illustrating a terminal interface in the method for displaying pages in an application program according to an exemplary embodiment.

FIG. 2 is a diagram illustrating a terminal interface which displays the path information of the pages according to an exemplary embodiment. In the embodiment, the terminal may display the links to each of the pages in the manner of page thumbnail, and the sequential relationship among the pages may be displayed by employing the manner of arrows. As shown in FIG. 2, with the path information of the pages displayed on the terminal interface, in the all of pages accessed after user entering the current application program which are recorded by the terminal, after user accessing the page 1, the page may be jumped from page 1 to page 2, then the page may be jumped from page 2 to page 3 for accessing. Moreover, the page accessed by the user may be jumped from page 1 to page 4. When the user click any one of page 1, page 2, page 3 and page 4, the terminal will jump to the page directly and cancel the displaying of the path information of the pages.

It can be seen that the terminal displays the path information of the pages by employing the manner of the page thumbnail in the embodiment, so that the user can better understand the pages organizational logic of the current application program and the sequential relationship of the accessed pages. Thus, the page to be accessed may be selected in the visual page thumbnails, and the quick presentation and switching between multiple pages can be implemented, and the user experience for the application program can be improved.

Figure 3:
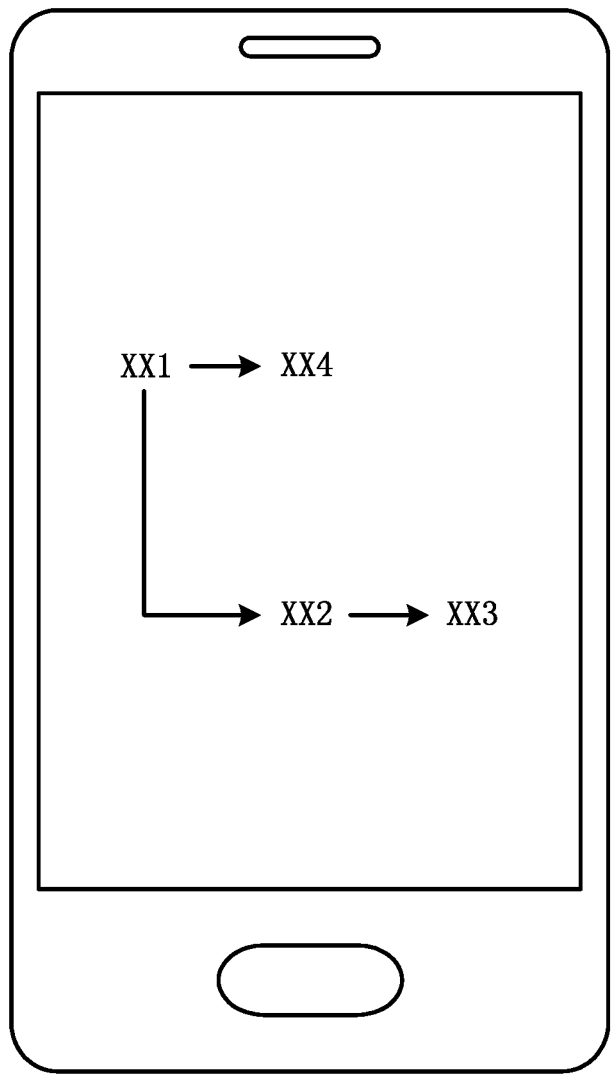
FIG. 3 is a diagram illustrating a terminal interface in the method for displaying pages in an application program according to an exemplary embodiment.

For the pages in the above described embodiments, if the terminal displays the link to each of the pages in the manner of the page name, the diagram of path information of the pages on the terminal interface is shown in FIG. 3. Wherein "XX1" is the name of page 1, "XX2" is the name of page 2, "XX3" is the name of page 3, and "XX4" is the name of page 4. With the path information of the pages displayed on the terminal interface, in the all of pages accessed after user entering the current application program which are recorded by the terminal, after user accessing the page 1, the page may be jumped from page 1 to page 2, then the page may be jumped from page 2 to page 3 for accessing. Moreover, the page accessed by the user may be jumped from page 1 to page 4. When the user click any one of "XX1", "XX2", "XX3" and "XX4", the terminal will jump to the page directly and cancel the displaying of the path information of the pages.

It can be seen that the terminal displays the path information of the pages by employing the manner of the page name in the embodiment, so that the user can better understand the pages organizational logic of the current application program and the sequential relationship of the accessed pages, and the page to be accessed may be selected conveniently and visually according to the page name. Thus, the quick presentation and switching between multiple pages can be implemented, and the user experience for the application program can be improved.

Displaying the path information of the pages by employing the manner of other page identification is similar with the page name, so it will not be described any more.

In one embodiment, the sequential relationship among the pages may be obtained in manner 1 or manner 2 as follow.

Figure 4A:
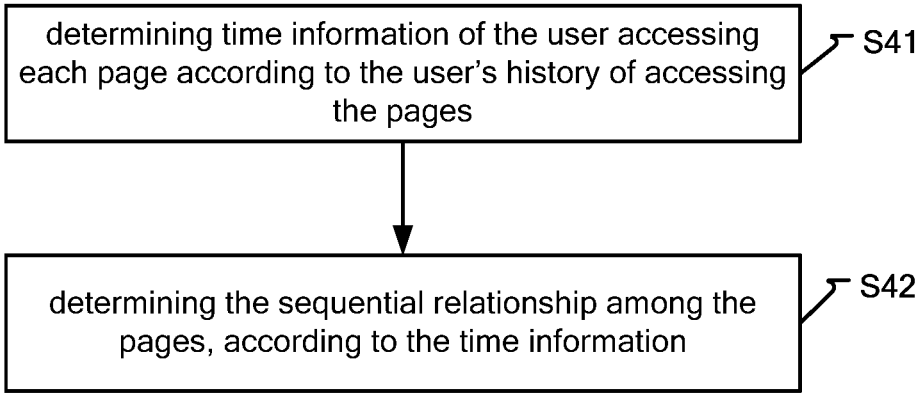
FIG. 4A is a flow diagram illustrating a method for displaying pages in an application program according to an exemplary embodiment.

Manner 1, as shown in FIG. 4A, the method further comprise step S41-S42 as follow.

In step S41, determining time information of the user accessing each page according to the user's history of accessing the pages.

In step S42, determining the sequential relationship among the pages according to the time information.

For example, the terminal may determine the time order for user accessing each page according to the time information to determine the sequential relationship among the pages.

In the embodiment, the sequential relationship among the pages can be determined according to the time information of the user accessing each page, so that the user can clearly understand the pages organizational logic of the current application program and the sequential relationship of the accessed pages, and avoid the chaos and inconvenience when using the application program.

Figure 4B:
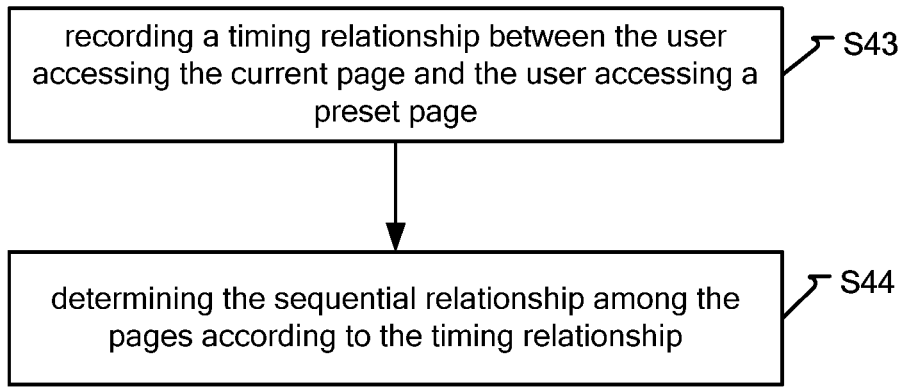
FIG. 4B is a flow diagram illustrating a method for displaying pages in an application program according to an exemplary embodiment.

Manner 2, as shown in FIG. 4B, the method further comprise step S43-S44 as follow.

In step S43, recording a timing relationship between the user accessing the current page and the user accessing a preset page.

In step S44, determining the sequential relationship among the pages according to the timing relationship.

In one embodiment, the preset page may be an initial page, or a previous adjacent page of the current page. For example, at the first the terminal may determine the time order for user accessing each page according to the timing relationship between the user accessing the current page and the user accessing the preset page, then determine the sequential relationship among the pages according to the time order for user accessing each page.

Certainly, the preset page may also be a page separated from the current page by N (N is a positive integer) pages and is not limited to the above described initial page or the previous adjacent page.

In the embodiment, the sequential relationship among the pages can be determined according to the timing relationship between the user accessing the current page and the user accessing the preset page, so that the user can clearly understand the pages organizational logic of the current application program and the sequential relationship of the accessed pages and avoid the chaos and inconvenience when using the application program.

Figure 5:
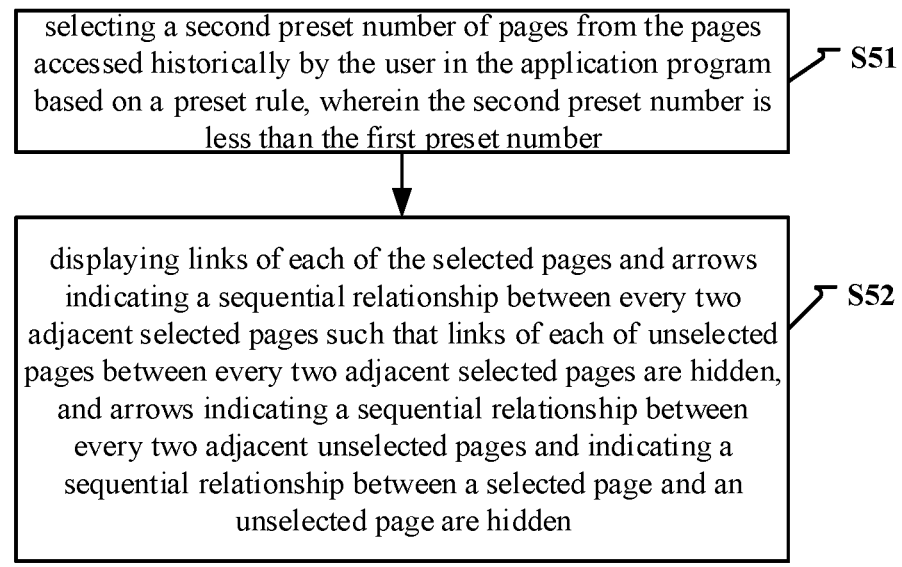
FIG. 5 is a flow diagram illustrating step S12 in the method for displaying pages in an application program according to an exemplary embodiment.

In one embodiment, when the number of pages accessed historically by the user in the application program is greater than or equals to a first preset number, as shown in FIG. 5, the method further comprise step S51-S52 as follow.

In step S51, selecting a second preset number of pages from the pages accessed historically by the user in the application program based on a preset rule, wherein the second preset number is less than the first preset number.

In one embodiment, the preset rule for example may be: selecting the second preset number of pages which were recently accessed according to the time information of all the pages that are accessed by the user. Thus, the user could obtain the path information of the pages that were accessed recently.

Alternatively, the preset rule for example may be: selecting the second preset number of pages with different subjects from all pages. Since different subjects may be more representative, the displayed pages with the different subjects contains more page information than the displayed pages with the same subjects, so that it enables the user to obtain the more information of the accessed pages from the path information of the pages with the different subjects.

In step S52, displaying the path information of the second preset number of pages, and hiding the path information of the pages other than the second preset number of pages.

In the embodiment, the path information of parts of the pages can be displayed selectively when the number of the pages accessed is large, so that the user can understand the pages organizational logic of the current application program and the sequential relationship of the accessed pages on the limited terminal interface, and avoid the chaos and inconvenience when using the application program.

Figure 6:
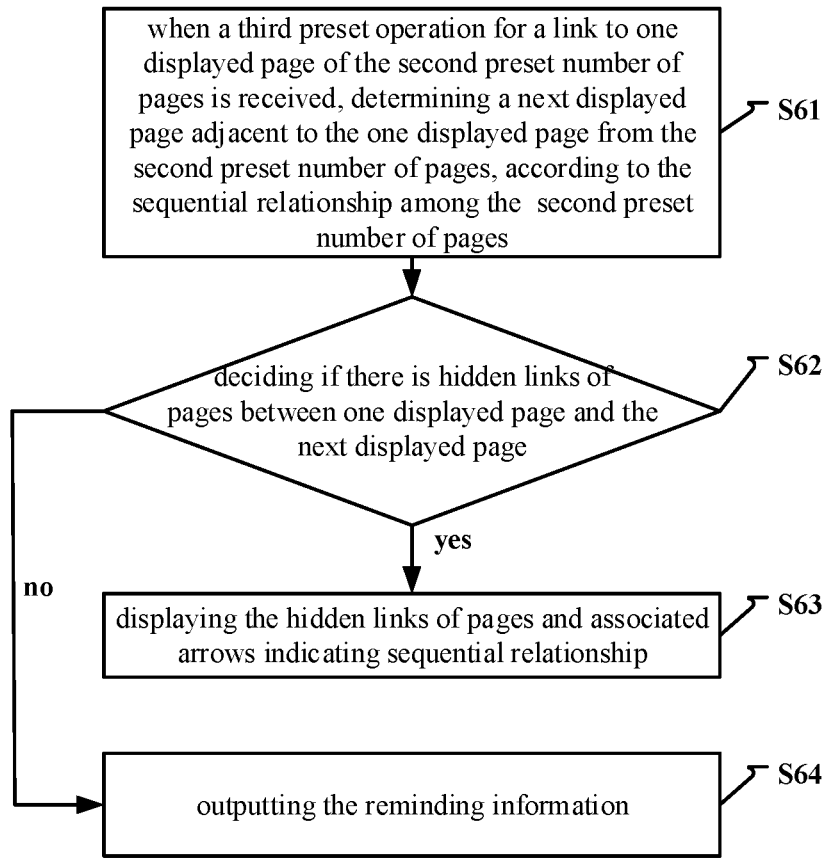
FIG. 6 is a flow diagram illustrating step S12 in the method for displaying pages in an application program according to an exemplary embodiment.

In one embodiment, when the number of pages accessed historically by the user in the application program is greater than or equals to a first preset number, as shown in FIG. 6, the step S12 further comprise step S61-S64 as follow.

In step S61, when a third preset operation for a link to one of the second preset number of pages is received, determining a next level page adjacent to the one of the pages, according to the sequential relationship among the pages.

In step S62, deciding if there is hidden path information between the page and next level page adjacent to the page; if there is hidden path information between the one of the pages and the next level page adjacent to the page, performing step S63; if there is no hidden path information between the one of the pages and the next level page adjacent to the page, performing step S64.

In step S63, displaying the hidden path information.

In step S64, outputting the reminding information. The reminding information may be used to remind the user that there is no hidden path information between the page corresponding to the third preset operation and the next level page adjacent to the page.

Wherein, there are various modes for outputting the reminding information. For example, outputting the reminding information in the mode of blinking the page corresponding to the third preset operation or in the mode of popping up with the reminding box and so on, the embodiments of the present disclosure do not limit for this.

To distinguish viewing the path information from accessing the pages, the third preset operation can be set as operations other than click operation, such as long press operation on the page link. When the user performs long press operation on the link of one of the pages, the terminal interface displays the hidden path information between this page and its next level page adjacent to this page or outputs reminding information; when the user clicks on the link of one of the pages, the terminal directly jumps from a current page to the page corresponding to the link clicked by the user.

In the embodiment, when the user performs the preset operation on the link of one of the pages, it displays the hidden path information between this page and its next level page adjacent to this page, and allows the user to clearly view the path information of all the pages even if the number of pages accessed historically is large, thereby the quick presentation and switching between multiple pages can be implemented.

Following is the device embodiments of the present disclosure which can be used to perform the method embodiments of the present disclosure.

Figure 7A:
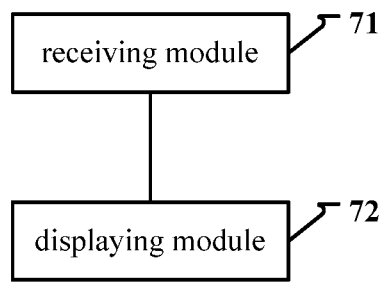
FIG. 7A is a block diagram illustrating a device for displaying pages in an application program according to an exemplary embodiment.
Figure 7B:
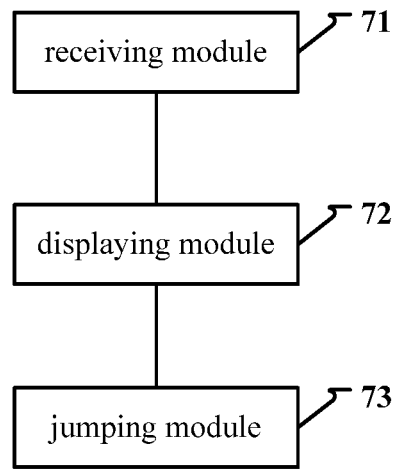
FIG. 7B is a block diagram illustrating a device for displaying pages in an application program according to an exemplary embodiment.

FIG. 7 is a block diagram illustrating a device for displaying pages in an application program according to an exemplary embodiment, which can be implemented as parts of or a whole electronic device by software, hardware or the combination thereof. Refer to FIG. 7, the device for displaying pages in an application program may comprise a receiving module 71 and a displaying module 72.

The receiving module 71 may be configured to receive a first preset operation of a user on an application program that is currently running.

Wherein, the first preset operation may be either click or long press operation for shortcut key, or click operation for the preset icon on the interface of the application program that is currently running.

The displaying module 72 may be configured to display path information of pages accessed historically by the user in the application program, according to the first preset operation, wherein the path information comprises a sequential relationship among the pages.

All the pages accessed after user entering the application program that is currently running may be recorded by the terminal system. After performing the first preset operation by the user, the displaying module 72 will display the path information of the recorded pages on the current interface of the terminal.

In one embodiment, the sequential relationship among the pages may be displayed in the manner of arrows or lines.

The displaying module 72 can display the path information of the pages accessed historically by the user in the application program that is currently running by employing the device provided in the embodiments of the present disclosure, so that the user can better understand the pages organizational logic of the current application program and the sequential relationship of the accessed pages according to the path information of the pages. Thus, the quick presentation and switching between multiple pages can be implemented, and the user experience for the application program can be improved.

In one embodiment, the path information displayed by the displaying module 72 further comprises a link to each of the pages. As shown in FIG. 7A, the device further comprises a jumping module 73.

The jumping module 73 may be configured to, when a second preset operation for the link displayed by the displaying module 72 is received, jump from a current page to the corresponding page.

Exemplarily, the second preset operation may be single or multiple click operation, long press operation, slide or drag operation, etc.

In the embodiment, when the operation for the link is received, the jumping module 73 can jump from a current page to a page corresponding to the link, so that the user can use the displayed link to quickly switch to the page to be viewed without jumping to multiple pages step-by-step. Thus, quick presentation and switching between multiple pages can be implemented, and the user experience for the application program can be improved.

In one embodiment, the link of the page comprises at least one of: a page identification, a page thumbnail with a preset size.

In one embodiment, the page identification may comprise any one or more of name, subject, website address. In one embodiment, the page thumbnail is original interface diagram of the page. Exemplarily, when the path information of the multiple pages accessed historically needs to be displayed on the terminal interface in manner of page thumbnail by the displaying module 72, the path information may be displayed in the page thumbnail with a preset size which should be smaller than the size of the terminal interface. In one embodiment, the preset size is a particular value that is smaller than the size of the original interface diagram, for example, $\frac{1}{8}$, $\frac{1}{3}$, $\frac{3}{4}$ of the size of the original interface. But the embodiments of the present disclosure is not limited to this, the preset size may be adjusted dynamically with the number of the pages: the more pages, the smaller preset size; the less pages, the larger preset size. For example, the corresponding relationship between the number of the pages and the preset size may be predetermined, when the number of the pages is multiplied, the preset size is reduced corresponding multiples. In the embodiment, when the displaying module 72 displays the path information of the pages by employing the manner of the page thumbnail, the user can select the page to be accessed in the visual page thumbnails; when the displaying module 72 displays the path information of the pages by employing the manner of the page identification, the user can select the page to be accessed conveniently and visually according to the page identification, thereby the user can better understand the pages organizational logic of the current application program and the sequential relationship of the accessed pages, and the quick presentation and switching between multiple pages can be implemented and the user experience for the application program can be improved.

Figure 8A:
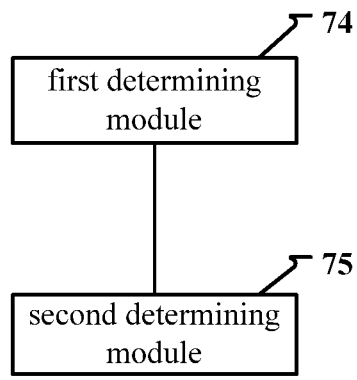
FIG. 8A is a block diagram illustrating a device for displaying pages in an application program according to an exemplary embodiment.

In one embodiment, as shown in FIG. 8A, the device further comprises a first determining module 74 and a second determining module 75.

The first determining module 74 may be configured to determine time information of the user accessing each page according to the user's history of accessing the pages.

The second determining module 75 configured to determine the sequential relationship among the pages according to the time information determined by the first determining module 74.

For example, the second determining module 75 may determine the time order for user accessing each page according to the time information to determine the sequential relationship among the pages.

In the embodiment, the second determining module 75 can determine the sequential relationship among the pages according to the time information of the user accessing each page, so that the user can clearly understand the pages organizational logic of the current application program and the sequential relationship of the accessed pages, and avoid the chaos and inconvenience when using the application program.

Figure 8B:
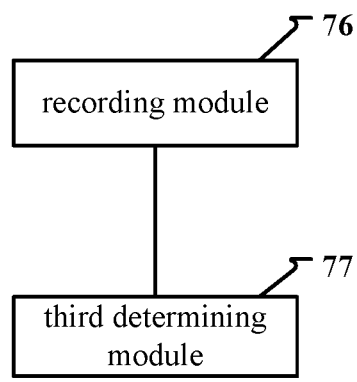
FIG. 8B is a block diagram illustrating a device for displaying pages in an application program according to an exemplary embodiment.

In one embodiment, as shown in FIG. 8B, the device further comprises a recording module 76 and a third determining module 77.

The recording module 76 may be configured to record a timing relationship between the user accessing the current page and the user accessing a preset page.

The third determining module 77 may be configured to determine the sequential relationship among the pages according to the timing relationship.

In one embodiment, the preset page may be an initial page, or a previous adjacent page of the current page. For example, at the first the terminal may determine the time order for user accessing each page according to the timing relationship between the user accessing to the current page and the user accessing to the preset page, then determine the sequential relationship among the pages according to the time order for user accessing each page.

Certainly, the preset page may also be a page separated from the current page by N (N is a positive integer) pages and is not limited to the above described initial page or the previous adjacent page.

In the embodiment, the third determining module 77 can determine the sequential relationship among the pages according to the timing relationship between the user accessing the current page and the user accessing the preset page, so that the user can clearly understand the pages organizational logic of the current application program and the sequential relationship of the accessed pages and avoid the chaos and inconvenience when using the application program.

Figure 9:
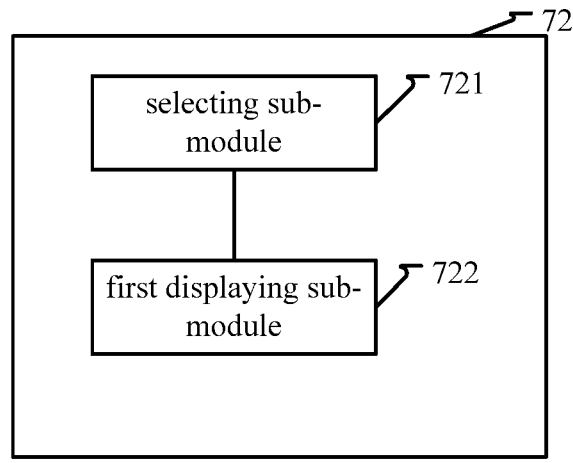
FIG. 9 is a block diagram illustrating a displaying module in the device for displaying pages in an application program according to an exemplary embodiment.

In one embodiment, as shown in FIG. 9, the displaying module 72 comprises a selecting sub-module 721 and a first displaying sub-module 722.

The selecting sub-module 721 may be configured to, when the number of pages accessed historically by the user in the application program is greater than or equals to a first preset number, select a second preset number of pages from the pages accessed historically by the user in the application program based on a preset rule, wherein the second preset number is less than the first preset number.

Exemplarily, the preset rule may be: selecting the second preset number of pages which were recently accessed according to the time information of all the pages that are accessed by the user. Thus, the user could obtain the path information of the pages that were accessed recently.

Alternatively, the preset rule may be: selecting the second preset number of pages with different subjects from all pages. Since different subjects may be more representative, the displayed pages with the different subjects contains more page information than the displayed pages with the same subjects, so that the user could obtain the more information of the accessed pages from the path information of the pages with the different subjects.

The first displaying sub-module 722 may be configured to display the path information of the second preset number of pages selected by the selecting sub-module 721 and hide the path information of the pages other than the second preset number of pages.

In the embodiment, the first displaying sub-module 722 can display the path information of parts of the pages selectively when the number of the pages that were accessed historically is large, so that the user can understand the pages organizational logic of the current application program and the sequential relationship of the accessed pages on the limited terminal interface, and avoid the chaos and inconvenience when using the application program.

Figure 10:
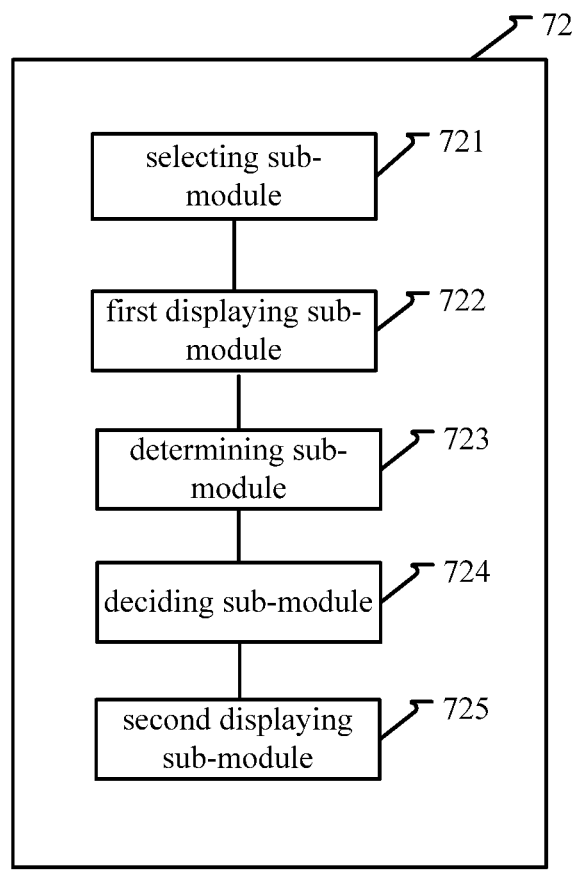
FIG. 10 is a block diagram illustrating a displaying module in the device for displaying pages in an application program according to an exemplary embodiment.

In one embodiment, as shown in FIG. 10, the displaying module 72 further comprises a determining sub-module 723 and a second displaying sub-module 725.

The determining sub-module 723 may be configured to, when a third preset operation for a link to one of the second preset number of pages displayed by the first displaying sub-module 722 is received, determine a next level page adjacent to the one of the pages, according to the sequential relationship among the pages.

The second displaying sub-module 725 may be configured to, when there is hidden path information between the one of the pages and the next level page, display the hidden path information.

In one embodiment, the displaying module 72 further comprise a deciding sub-module 724, the deciding sub-module may be configured to decide if there is hidden path information between one of the page and next level page determined by the determining sub-module 723.

To distinguish viewing the path information from accessing the pages, the third preset operation can be set as operations other than click operation, such as long press operation on the page link. When the user performs long press operation on the link of one of the pages, the second display sub-module 725 displays the hidden path information between this page and its next level page adjacent to this page on the terminal interface or outputs reminding information; when the user clicks on the link of one of the pages, the terminal directly jumps from a current page to the page corresponding to the link clicked by the user.

In the embodiment, when the user performs the preset operation on the link of one of the pages, the second display sub-module 725 can displays the hidden path information between this page and its next level page adjacent to this page, and allows the user to clearly view the path information of all the pages even if the number of pages that were accessed historically is large, thereby the quick presentation and switching between multiple pages can be implemented.

In one embodiment, if the deciding sub-module 724 decides there is no hidden path information between one of the page and the next level page, the reminding information may be output; the reminding information may be used to remind the user that there is no hidden path information between the page corresponding to the second preset operation and the next level page adjacent to the page.

A device for displaying pages in application program is provided in exemplary embodiments, and the device includes: a processor; a memory for storing instructions executable by the processor; wherein the processor may be configured to: receive a first preset operation of a user on an application program that is currently running; display path information of pages accessed historically by the user in the application program according to the first preset operation, wherein the path information comprise a sequential relationship among the pages.

With respect to the devices in the above embodiments, the specific manners that the respective modules perform operations have been described in detail in the embodiments regarding the relevant methods, and will not be elaborated herein.

Figure 11:
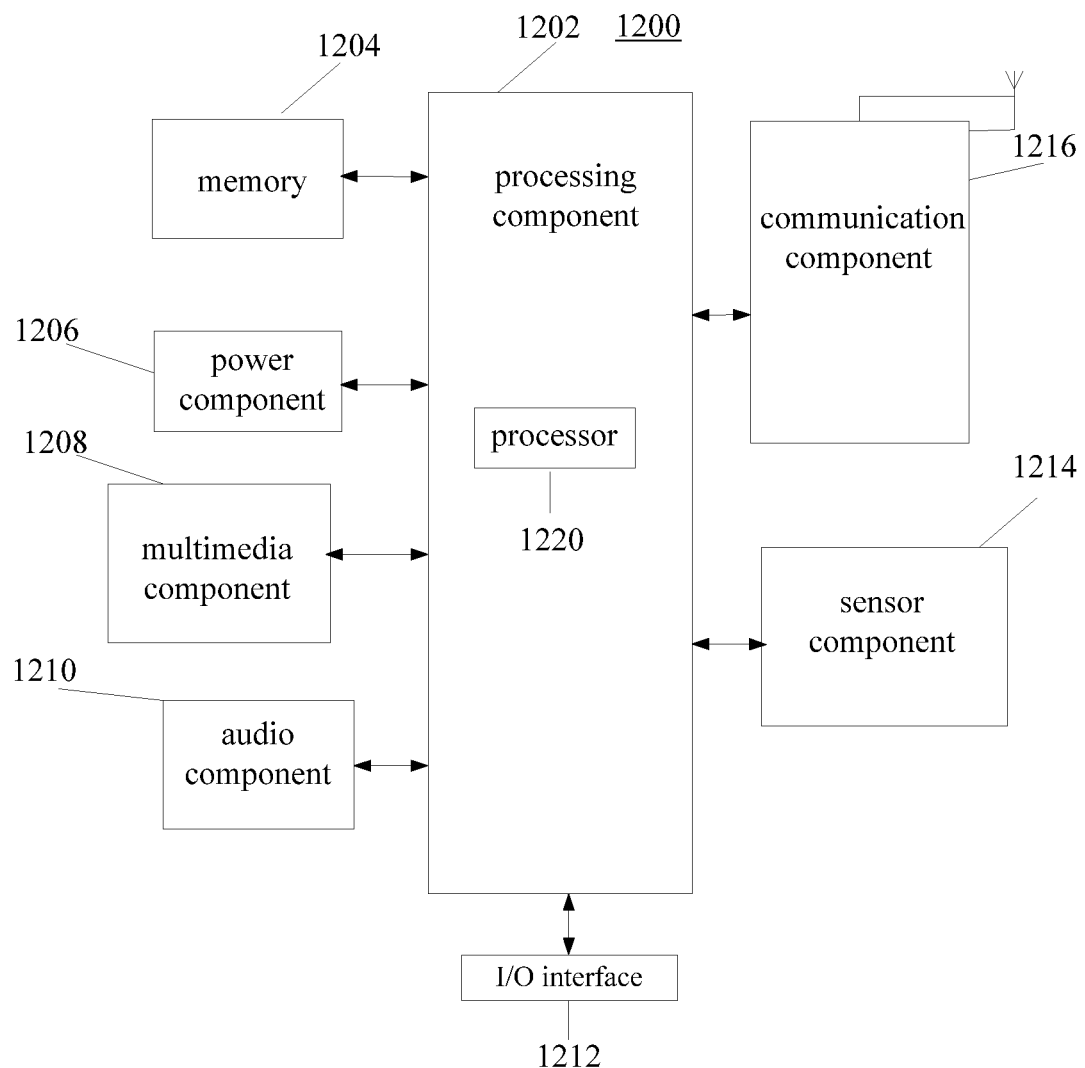
FIG. 11 is a block diagram illustrating a device suitable for displaying pages in an application program according to an exemplary embodiment.

FIG. 11 is a block diagram illustrating a device for displaying pages in application program according to an exemplary embodiment. For example, the device 1200 may be a mobile phone, a computer, digital broadcasting terminal, a message transceiver, a game control panel, a tablet, a medical equipment, a fitness equipment, a personal digital assistant, etc.

The device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power for the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the device 1200 is in an operation mode, such as a photographing mode or a video mode. Each of the front camera and the rear camera may be a fixed optical lens system or have optical focusing and zooming capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, the peripheral interface modules being, for example, a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components (e.g., the display and the keypad, of the device 1200), a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of a nearby object without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2Q or 3Q or a combination thereof. In an exemplary embodiment, the communication component 1216 receives a broadcast signal or broadcast associated information from an external broadcast management system via a broadcast channel. In an exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium having stored therein instructions that, when executed by the processor of the device 1200, causes the device 1200 to perform the above described the method for displaying pages in application program.

Other embodiments of the disclosure will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for displaying a history of pages in a mobile application program, the method comprising:

receiving a first preset operation from a user on a mobile application program that is currently running; and when a number of pages accessed historically by the user in the mobile application program is less than a first preset number, displaying links of each of the pages accessed historically by the user in the mobile application program and arrows indicating a sequential relationship between every two adjacent pages among all of the accessed pages according to the first preset operation;

when the number of pages accessed historically by the user in the mobile application program is greater than or equals to the first preset number, selecting a second preset number of pages from all of the pages accessed historically by the user in the mobile application program based on a preset rule specified by the user, wherein the second preset number is less than the first preset number, displaying links of each of the selected pages and arrows indicating a sequential relationship between every two adjacent selected such that links of each of unselected pages between every two adjacent selected pages are hidden, and arrows indicating a sequential relationship between every two adjacent unselected pages and indicating a sequential relationship between a selected page and an unselected page are hidden, receiving a third preset operation from the user for a link to one displayed page of the second preset number of pages, determining a next displayed page adjacent to the one page associated with the third preset operation from the second preset number of pages according to the sequential relationship among the second preset number of pages, determining whether, there are any hidden links of pages between the one displayed page and the next displayed page, and displaying the hidden links of pages and associated arrows indicating a sequential relationship between the one displayed page and the next displayed page in response to determining that there are hidden links of pages between the one displayed page and the next displayed page, or outputting reminding information indicating that there is no hidden information in response to determining that there are no hidden links of pages between the one displayed page and the next displayed page.

2. The method of claim 1, wherein the method further comprises: jumping from a current page to a page corresponding to the link of the one displayed page of the second preset number of pages when a second preset operation from the user for the link is received, wherein the second preset operation is different from the third preset operation.

3. The method of claim 2, wherein each of the links displayed from the first preset number or the second preset number comprises at least one of:
a page identification; and
a page thumbnail with a preset size.

4. The method of claim 1, wherein the method further comprises:
determining time information of the user accessing each page according to the user's history of accessing the pages; and
determining the sequential relationship among the pages according to the time information.

5. The method of claim 1, wherein the method further comprises:

recording a timing relationship between the user accessing a current page and the user accessing a preset page; and determining the sequential relationship among the pages according to the timing relationship.

6. A device for displaying a history of pages in a mobile application program, the device comprising:
a processor;
a memory for storing instructions executable by the processor; wherein the processor is configured to:
receive a first preset operation from a user on a mobile application program that is currently running; and
when a number of pages accessed historically by the user in the mobile application program is less than a first preset number,
display links of each of the pages accessed historically by the user in the mobile application program and arrows indicating a sequential relationship between every two adjacent pages among all of the accessed pages according to the first preset operation;
when the number of pages accessed historically by the user in the mobile application program is greater than or equals to the first preset number,
select a second preset number of pages from all of the pages accessed historically by the user in the mobile application program based on a preset rule specified by the user, wherein the second preset number is less than the first preset number,
display links of each of the selected pages and arrows indicating a sequential relationship between every two adjacent selected pages such that links of each of unselected pages between every two adjacent selected pages are hidden, and arrows indicating a sequential relationship between every two adjacent unselected pages and indicating a sequential relationship between a selected page and an unselected page are hidden,
receive a third preset operation from the user fora link to one displayed page of the second preset number of pages,
determine a next displayed page adjacent to the one page associated with the third preset operation from the second preset number of pages according to the sequential relationship among the second preset number of pages,
determine whether there are any hidden links of pages between the one displayed page and the next displayed page, and
display the hidden links of pages and associated arrows indicating a sequential relationship between the one displayed page and the next displayed page in response to determining that there are hidden links of pages between the one displayed page and the next displayed, or
output reminding information indicating that there is no hidden information in response to determining that there are no hidden links of pages between the one displayed page and the next displayed page.

7. The device of claim 6, wherein the processor is further configured to:
jump from a current page to a page corresponding to the link of the one displayed page of the second preset number of pages when a second preset operation from the user for the link is received, wherein the second preset operation is different from the third preset operation.

8. The device of claim 7, wherein each of the links displayed from the first preset number or the second preset number comprises at least one of:
   a page identification; and
   a page thumbnail with a preset size.

9. The device of claim 6, wherein the processor is further configured to:
   determine time information of the user accessing each page, according to the user's history of accessing the pages; and
   determine the sequential relationship among the pages, according to the time information.

10. The device of claim 6, wherein the processor is further configured to:
    record a timing relationship between the user accessing a current page and the user accessing a preset page; and
    determine the sequential relationship among the pages according to the timing relationship.

11. A non-transitory computer-readable storage medium having stored therein instructions that, when executed by a mobile processor, causes the mobile processor to perform a method for displaying a history of pages in a mobile application program, the method comprising:
    receiving a first preset operation from a user on a mobile application program that is currently running; and
    when a number of pages accessed historically by the user in the mobile application program is less than a first preset number,
    displaying links of each of the pages accessed historically by the user in the mobile application program and arrows indicating a sequential relationship between every two adjacent pages among all of the accessed pages according to the first preset operation;
    when the number of pages accessed historically by the user in the mobile application program is greater than or equals to the first preset number,
    selecting a second preset number of pages from all of the pages accessed historically by the user in the mobile application program based on a preset rule specified by the user, wherein the second preset number is less than the first preset number,
    displaying links of each of the selected pages and arrows indicating a sequential relationship between every two adjacent selected pages such that links of each of unselected pages between every two adjacent selected pages are hidden, and arrows indicating a sequential relationship between every two adjacent unselected pages and indicating a sequential relationship between a selected page and an unselected page are hidden,
    receiving a third preset operation from the user for a link to one displayed page of the second preset number of pages,
    determining a next displayed page adjacent to the one page associated with the third preset operation from the second preset number of pages according to the sequential relationship among the second preset number of pages,
    determining whether there are any hidden links of pages between the one displayed page and the next displayed page, and
    displaying the hidden links of pages and associated arrows indicating a sequential relationship between the one displayed page and the next displayed page in response to determining that there are hidden links of pages between the one page and the next displayed page, or
    outputting reminding information indicating that there is no hidden information in response to determining that there are no hidden links of pages between the one page and the next displayed page.

* * * * *